(12) United States Patent
Katayama

(10) Patent No.: US 11,458,769 B2
(45) Date of Patent: Oct. 4, 2022

(54) PNEUMATIC TIRE

(71) Applicant: BRIDGESTONE CORPORATION, Tokyo (JP)

(72) Inventor: Shinsaku Katayama, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 560 days.

(21) Appl. No.: 16/390,245

(22) Filed: Apr. 22, 2019

(65) Prior Publication Data

US 2019/0248183 A1     Aug. 15, 2019

Related U.S. Application Data

(63) Continuation of application No. 14/127,279, filed as application No. PCT/JP2012/003236 on May 17, 2012, now abandoned.

(30) Foreign Application Priority Data

Jun. 20, 2011   (JP) ................... 2011-136674

(51) Int. Cl.
*B60C 9/28* (2006.01)
*B60C 3/04* (2006.01)
(Continued)

(52) U.S. Cl.
CPC .............. *B60C 3/04* (2013.01); *B60C 9/0292* (2013.01); *B60C 9/28* (2013.01); *B60C 15/0036* (2013.01);
(Continued)

(58) Field of Classification Search
CPC ....... B60C 9/28; B60C 9/18; B60C 2009/283; B60C 2009/286; B60C 3/00; B60C 3/04;
(Continued)

(56) References Cited

U.S. PATENT DOCUMENTS

| 3,570,575 A | 3/1971 | Marker et al. |
| 4,957,151 A | 9/1990 | Takehara et al. |

(Continued)

FOREIGN PATENT DOCUMENTS

| JP | 57-87704 A | 6/1982 |
| JP | 5-201202 A | 8/1993 |

(Continued)

OTHER PUBLICATIONS

Communication dated Mar. 16, 2016 from The United States Patent and Trademark Office in counterpart U.S. Appl. No. 14/127,279.
(Continued)

*Primary Examiner* — Adrienne C. Johnstone
(74) *Attorney, Agent, or Firm* — Sughrue Mion, PLLC

(57) ABSTRACT

Provided is a pneumatic tire having at least one carcass layer as a skeleton extending in toroidal shape over a pair of bead portions, at least one belt layer and a tread disposed on an outer side in the radial direction of a crown portion of the carcass. In a tire section in the widthwise direction in state where the tire is assembled to an application rim, ratio BD/BW of radius difference BD between radius at a center portion and radius at an end portion in the widthwise direction of an innermost layer of the belt layer, to width BW of the innermost layer, ranges from 0.01 to 0.04, and ratio TD/TW of radius difference TD between radius at a center portion and radius at an end portion of the tread in the widthwise direction of a tread ground surface, to tread ground-contact width TW, satisfies BD/BW<TD/TW.

8 Claims, 7 Drawing Sheets

(51) Int. Cl.
  *B60C 11/00* (2006.01)
  *B60C 9/02* (2006.01)
  *B60C 15/00* (2006.01)

(52) U.S. Cl.
  CPC ..... *B60C 11/0083* (2013.01); *B60C 2009/283* (2013.01); *B60C 2011/0033* (2013.01); *B60C 2015/009* (2013.01); *Y02T 10/86* (2013.01); *Y10T 152/10765* (2015.01)

(58) Field of Classification Search
  CPC ............. B60C 11/0083; B60C 11/0008; Y10T 152/10765
  USPC ......................................... 152/454, 526, 538
  See application file for complete search history.

(56) References Cited

U.S. PATENT DOCUMENTS

| | | | |
|---|---|---|---|
| 5,115,853 | A | 5/1992 | Oare et al. |
| 6,321,809 | B1 | 11/2001 | Buenger et al. |
| 6,575,214 | B1 | 6/2003 | Iwasaki et al. |
| 2004/0238094 | A1 | 12/2004 | Kajita |
| 2011/0114238 | A1 | 5/2011 | Takahashi et al. |

FOREIGN PATENT DOCUMENTS

| | | |
|---|---|---|
| JP | 2006-327502 A | 12/2006 |
| JP | 2009-78425 A | 4/2009 |
| JP | 2009-166819 A | 7/2009 |
| JP | 2009-279948 A | 12/2009 |
| JP | 2010-167849 A | 8/2010 |
| WO | 2009-078425 A1 | 6/2009 |
| WO | WO 2011/043041 A1 | 4/2011 |

OTHER PUBLICATIONS

Communication dated May 5, 2016 to The United States Patent and Trademark Office in counterpart U.S. Appl. No. 14/127,279.
Communication dated Aug. 15, 2016 from The United States Patent and Trademark Office in counterpart U.S. Appl. No. 14/127,279.
Communication dated Dec. 14, 2016 to The United States Patent and Trademark Office in counterpart U.S. Appl. No. 14/127,279.
Communication dated Apr. 20, 2017 from The United States Patent and Trademark Office in counterpart U.S. Appl. No. 14/127,279.
Communication dated Jul. 19, 2017 to The United States Patent and Trademark Office in counterpart U.S. Appl. No. 14/127,279.
Communication dated Nov. 29, 2017 from The United States Patent and Trademark Office in counterpart U.S. Appl. No. 14/127,279.
Communication dated Feb. 28, 2018 to The United States Patent and Trademark Office in counterpart U.S. Appl. No. 14/127,279.
Communication dated May 10, 2018 from The United States Patent and Trademark Office in counterpart U.S. Appl. No. 14/127,279.
Communication dated Sep. 7, 2018 to The United States Patent and Trademark Office in counterpart U.S. Appl. No. 14/127,279.
Communication dated Jan. 23, 2019 from The United States Patent and Trademark Office in counterpart U.S. Appl. No. 14/127,279.
Communication dated Aug. 4, 2015 from the Japanese Patent Office in counterpart application No. 2011-136674.
Communication dated Jan. 6, 2015 from the Japanese Patent Office in counterpart Application No. 2011-136674.
Communication dated Jun. 15, 2015 from the State Intellectual Property Office of the P.R.C. in counterpart application No. 201280030455.7.
Communication dated Jun. 3, 2015, issued by the European Patent Office in corresponding European Application No. 12803157.2.
International Search Report for PCT/JP2012/003236 dated Jul. 10, 2012.
Japanese Office Action, dated Apr. 11, 2014, issued in corresponding Japanese Patent Application No. 2011-136674.
English machine translation of JP 2009-166819 A, Jul. 30, 2009.

No-load condition

Load-bearing condition

No-load condition

Load-bearing condition

PNEUMATIC TIRE

CROSS-REFERENCE TO RELATED APPLICATION

This application is a continuation of U.S. application Ser. No. 14/127,279, filed Dec. 18, 2013, now abandoned, which is a § 371 National Stage Application of PCT Application No. PCT/JP2012/003236, filed May 17, 2012, which claims priority to and the benefit of Japanese Patent Application No. 2011-136674 filed Jun. 20, 2011, the entire contents of each of which are incorporated herein by reference.

TECHNICAL FIELD

The present invention relates to a pneumatic tire that has low rolling resistance, good partial wear resistance performance, and reduced weight.

BACKGROUND ART

Recently, in order to address environmental problems such as global warming, products having less of an adverse impact on the environment are being actively developed. Tires are no exception to such products. In case of tires, in order to address the environmental problems, it is important to ensure tire performance that would contribute to higher fuel efficiency of vehicles. As one method to achieve the above task, reducing tire rolling resistance and tire weight has been proposed, and various technologies have been developed until now.

Some of the conventional improvement methods for reducing tire rolling resistance are as follows.

To start with, it is known that a large portion of tire rolling resistance is generated in rubber of a tread portion. As a method for directly addressing the problem, it is effective to replace the rubber for use in the tread portion with rubber with a smaller loss tangent. However, the above method is also known to sacrifice other performance of tires such as wear resistance performance. As another method, it may be easily conceived to reduce a tread thickness so as to reduce rubber, that is to say, the origin of rolling resistance. However, the above method poses a problem that a sufficient wear-resisting period of the tires may not be ensured.

Patent Literature 1 proposes reducing rolling resistance by regulating a shape of a section of a tire. Although the proposed method indeed makes it possible to reduce rolling resistance, when compatibility with other performance, in particular with good wear resistance performance, is considered, a more meticulous tire design is required.

Although Patent Literature 2 discloses reduction in rolling resistance and improvement of wear resistance performance by the more meticulous design of a tire shape, the tire needs to be designed even more meticulously when the weight of the tire is to be reduced.

CITATION LIST

Patent Literature

PL1: JP2006327502A
PL2: JP2009166819A

SUMMARY OF INVENTION

Technical Problem

In view of the above, the present invention is to propose details of a tire shape for achieving a pneumatic tire that has low rolling resistance, good partial wear resistance performance, and reduced weight.

The present inventor has found that performance of a tire can be improved as desired by meticulously regulating the tire shape and that it is effective to individually regulate respective shapes of reinforcing members as a skeleton of the tire because the shapes of the reinforcing members have significant influence on tire performance. Specifically, the inventor of the present invention has found that, by suppressing shear deformation of a tire in a section in a tire width direction, particularly shear deformation in a tread on an outer side in the widthwise direction thereof, improvement is achieved simultaneously in reduction in rolling resistance resulting from energy loss caused by the deformation and in reduction of wear often generated by shearing force and slip also caused by the deformation.

Furthermore, in the present invention, the present inventor has regulated the shapes of the reinforcing members and then studied the shape of an optimal tire outer surface when the tire is combined with the shapes of the reinforcing members. Then, the present inventor has found that wear resistance performance is ensured even when the tread thickness is reduced, although conventionally it was not possible to reduce the tread thickness. Thus, the present inventor has found that three types of performance, i.e., reduction in rolling resistance, improvement of partial wear resistance performance, and reduction in weight, are simultaneously satisfied, thereby completing the present invention.

Solution to Problem

Primary features of the present invention are as follows.
(1) A pneumatic tire having at least one carcass layer as a skeleton extending in a toroidal shape over a pair of bead portions, at least one belt layer and a tread that are disposed on an outer side in a tire radial direction of a crown portion of the carcass layer, wherein
in a section of the tire in a tire widthwise direction in a state where the tire is assembled to an application rim,
a ratio BD/BW of radius difference BD between radius at a center portion and radius at an end portion in the tire widthwise direction of an innermost layer of the belt layer, to a width BW of the innermost layer, is in the range of 0.01 to 0.04, and
a ratio TD/TW of radius difference TD between radius at a center portion and radius at an end portion of the tread in the tire widthwise direction of a tread ground surface, to a tread ground-contact width TW, satisfies the relation BD/BW<TD/TW.
(2) The pneumatic tire according to the above item (1), wherein
a ratio TGh/TGc of a tread gauge TGh measured in a tread end portion, to a tread gauge TGc measured in a tread center portion, is in the range of 0.5 to 0.9, and
a ratio TGe/TGc of a tread gauge TGe measured in the end portion in the tire widthwise direction of the innermost layer to a tread gauge TGc measured in the tread center portion is in the range of 0.2 to 0.6.

(3) The pneumatic tire according to the above item (1) or (2), wherein a ratio CSWh/CSH of a shortest distance CSWh between a line drawn in parallel with a rotation axis of the tire at a maximum width position of the carcass and a line drawn in parallel with the rotation axis of the tire at a bead toe, to a distance CSH in the tire radial direction between an outermost side of the carcass in the tire radial direction and the bead toe, is in the range of 0.6 to 0.9.

(4) The pneumatic tire according to any one of the above items (1)-(3), wherein

A ratio SWh/SH of a shortest distance SWh between a line drawn in parallel with the rotation axis of the tire at a maximum width position of the tire and a line drawn in parallel with the rotation axis of the tire at the bead toe, to a sectional height SH of the tire, is in the range of 0.5 to 0.8.

(5) The pneumatic tire according to any one of the above items (1)-(4), wherein a ratio BW/CSW of the width BW of the innermost layer, to a maximum width CSW of the carcass, is in the range of 0.8 to 0.94.

(6) The pneumatic tire according to the above items (1)-(5), wherein a ratio CSL/CSP of a path length CSL from a position corresponding to the end portion in the tire widthwise direction of the innermost layer to a position corresponding to the maximum width position of the carcass, to a path length CSP from a position corresponding to the center portion in the tire widthwise direction of the innermost layer to a position right below a bead core, is in the range of 0.1 to 0.25.

(7) The pneumatic tire according to any one of the above items (1)-(6), wherein a shortest distance CSEh between a terminal end of a turn-up portion of at least one carcass ply layer and a line drawn in parallel with the rotation axis of the tire at the bead toe is greater than the shortest distance SWh.

BRIEF DESCRIPTION OF THE DRAWING

The present invention will be further described below with reference to the accompanying drawings, wherein.

DESCRIPTION OF EMBODIMENTS

The following describes a pneumatic tire according to the present invention in detail with reference to the drawings.

Figure 1:
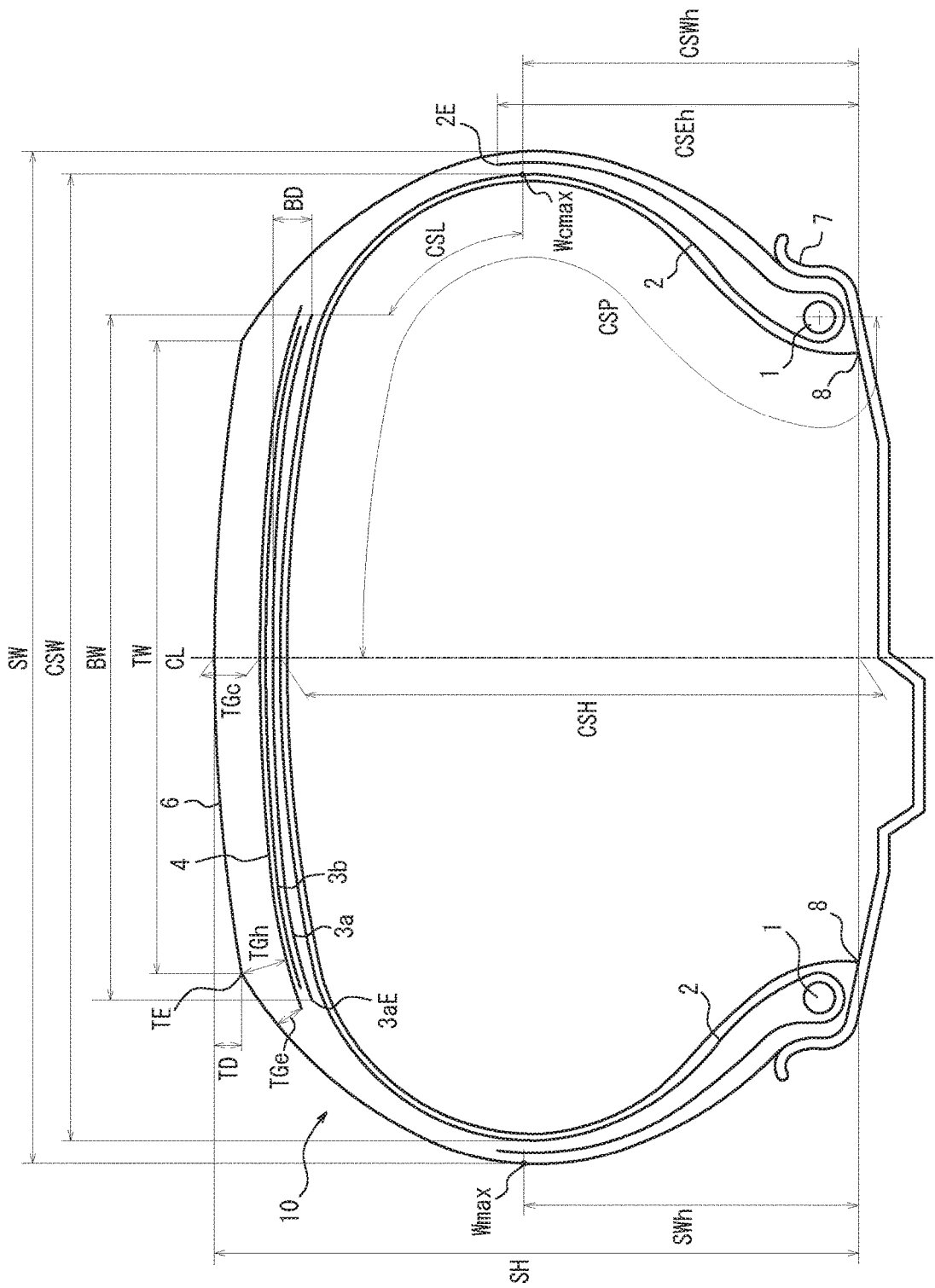
FIG. 1 is a view illustrating a section in a widthwise direction of a pneumatic tire according to the present invention.

FIG. 1 illustrates a section of a pneumatic tire (which may be referred to below as a tire) according to the present invention in a widthwise direction thereof. A tire 10 according to the present invention includes: a carcass 2 as a skeleton, having at least one carcass ply layer (one carcass ply layer in the illustrated example) that extends toroidally between bead portions each embedded with one of a pair of bead cores 1 and that is turned up along each of the bead cores 1 from an inner side to an outer side in the tire widthwise direction; a belt disposed on the outer side in a radial direction of a crown portion of the carcass 2, the belt having at least one slant belt layer (two slant layers 3a and 3b in the illustrated example) formed by coating a number of cords extending in a direction inclined with respect to an equatorial plane CL of the tire with rubber and one circumferential belt layer 4 formed by coating a number of cords extending along the equatorial plane CL of the tire with rubber; and a tread 6 disposed on the outer side in the radial direction of the belt. The cords of the at least one slant belt layer extend in a direction inclined at an angle of at least 5 degrees with respect to an equatorial plane of the tire and greater than the cord angle of the circumferential belt layer.

The tire 10 as described above is assembled to an application rim 7 and served for use. In the present embodiment, a ratio BD/BW of a radius difference BD between radius at a center portion (the tire equatorial plane CL) and radius at an end portion 3aE in the widthwise direction of the innermost layer 3a among the slant belt layers 3a and 3b and the circumferential belt layer 4, to a width BW of the innermost layer 3a, is in the range of 0.01 to 0.04, in a section in the tire widthwise direction in a state where the tire 10 is assembled to the application rim 7.

Note that it is preferable that the radius difference of the innermost layer 3a in the tire radial direction gradually decreases from the center portion (the tire equatorial plane CL) to the end portion 3aE in the widthwise direction.

A ratio TD/TW of a radius difference TD between a radius at the center portion (the tire equatorial plane CL) and a tread end portion TE of a tread ground surface, to a tread ground-contact width TW, satisfies the relation BD/BW<TD/TW.

It is preferable that the radius difference of a tread surface in the tire radial direction gradually decreases from the center portion in the widthwise direction (the tire equatorial plane CL) to the tread end portion TE of the tread ground surface.

The state where the tire 10 is assembled to the application rim 7 refers to a state where the tire 10 is assembled to a standard rim specified by JATMA and the tire is not filled with an internal pressure or filled with an extremely low internal pressure of up to approximately 30 kPa.

The tread ground-contact width TW refers to a width of the ground contact surface of the tread that comes into contact with a road surface when the tire 10 is pressed against the road surface (e.g. a smooth road surface such as a steel road surface) at the specified internal pressure and at load of 80% in the state where the tire 10 is assembled to the standard rim specified by the JATMA.

Note that, when the TRA and the ETRTO standard are applied in regions where tire is manufactured and used, these standards are to be complied with.

The radius differences BD and TD are measured in a direction parallel to the tire equatorial plane CL.

Although in the description herein the radius difference BD and the width BW are defined by a dimension of the innermost layer, the innermost layer refers to a layer positioned radially innermost among belt layers having a width greater than or equal to 90% of the tread ground-contact width TW. That is to say, even when a belt layer having a width less than 90% of the tread ground-contact width TW is positioned radially innermost, this belt layer is not regarded as the innermost layer defined in the present invention. From the viewpoint of usability and specification of the tread gauge described below, it is preferable that the relation TW BW is satisfied, and it is more preferable that the relation 1.1 BW/TW 1.6 is satisfied.

The restriction that the BD/BW is in the range of 0.01 to 0.04 means that the radius difference of the slant belt layer 3a in the width direction thereof is small. In other words, the restriction means that the belt is nearly flat.

Figure 2A:
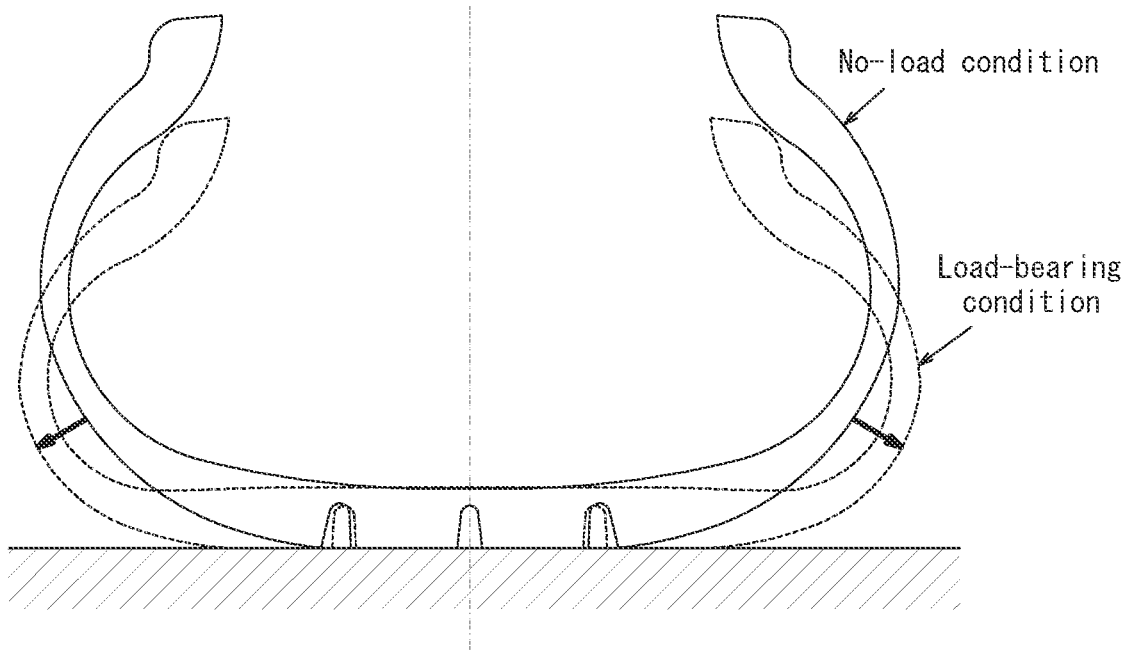
FIG. 2A is a view illustrating behaviors before and after application of load to a conventional pneumatic tire.

As described above, rolling resistance is primarily due to energy loss occurring in rubber of the tread portion, and it is effective to suppress shear deformation, the shear deformation being one example of relevant deformation, in the section in the width direction in order to reduce rolling resistance. Shear deformation described above occurs due to deformation before and after application of load by which the belt which was curved in the ground-contact area is extended flat, as indicated in FIG. 2A (refer to arrows) by a solid line representing a no-load state before a radial tire (with the ratio BD/BW=0.050) having a normal sectional shape of the size 195/65 R15 is filled with the internal pressure and by a broken line representing a loaded state where the radial tire has been filled with an internal pressure of 210 kPa and then applied with load of 4.41 kN. As illustrated in FIG. 2A, a normal radial tire has a radius difference due to a smaller radius in a shoulder portion relative to that in a tread center portion, a portion of the belt that is located near the shoulder portion is stretched in the tire circumferential direction.

As a result, the slant belt layer in which cords are disposed crisscross are deformed like a pantograph to be extended in the circumferential direction, and accordingly, shrink in the width direction. Consequently, the aforementioned shear deformation is promoted, resulting in an increase in hysteresis loss of the tread rubber.

Figure 2B:
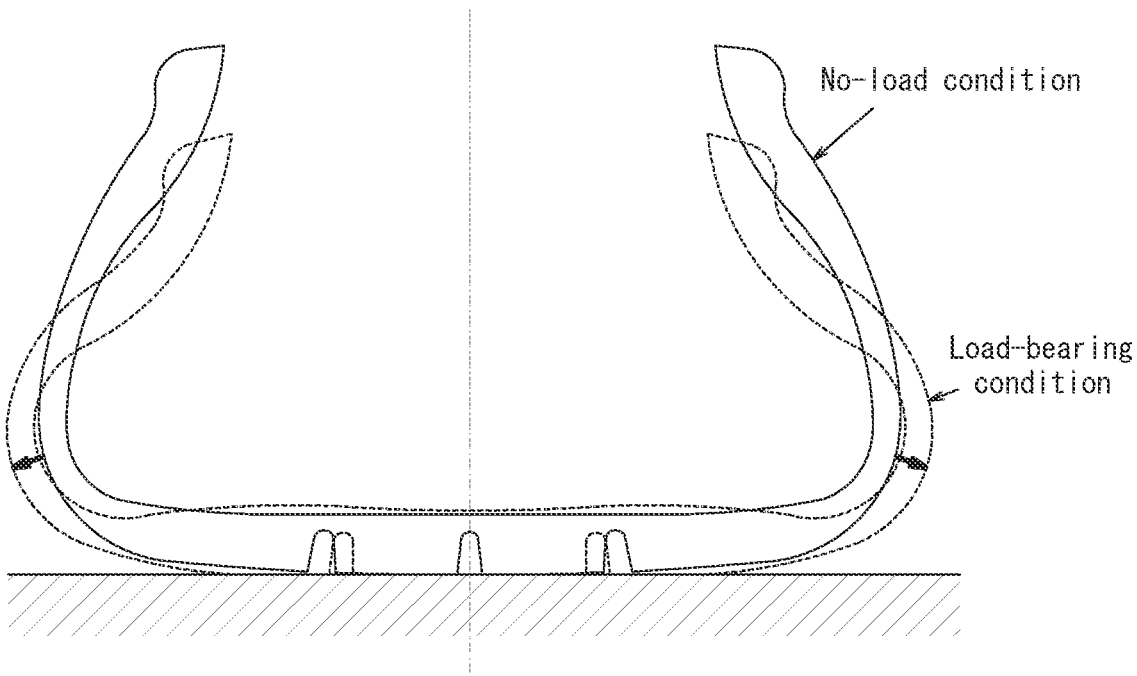
FIG. 2B is a view illustrating behaviors before and after application of load to a pneumatic tire according to the present invention.

The easiest way to prevent the deformation, in terms of the tire shape, is to design the belt as flat as possible. For example, assume a tire having the same size as the tire illustrated in FIG. 2A in which the belt is flat (with the ratio BD/BW=0.026) and assume the deformation before and after application of load under the same condition as the example illustrated in FIG. 2A. By setting the ratio BD/BW to be 0.04 or less, as shown in FIG. 2B (refer to arrows), the deformation before and after application of load is limited to an extremely low level. Accordingly, by setting the ratio BD/BW to be 0.04 or less, hysteresis loss of the tread rubber is reduced, and the tire with low rolling resistance is achieved.

In actual tire designing, it is essential to set curvedness of the tire in an appropriate range without making the belt completely flat, in view of a deformation component associated with deformation of a side portion and also in view of a ground-contact configuration and distribution of ground-contact pressure required for prevention of uneven wear. An ardent study on the appropriate range has revealed that the ratio BD/BW is be at least 0.01. With the above structure, shear deformation of the tread rubber is limited, and therefore shearing force and distribution of slip within the contact patch change toward reduction. Thus, the above structure provides an advantageous effect of improving partial wear resistance performance at the same time.

The restriction that the ratio BD/BW and the ratio TD/TW satisfy the relation BD/BW<TD/TW indicates that the belt has the flat shape, while the shape of the crown portion on the tire outer surface has a greater falling ratio than the belt and is curved.

Similarly to the belt shape, in order to obtain an appropriate ground-contact configuration and an appropriate distribution of ground-contact pressure, it is essential to define the shape of the tire outer surface to have an appropriate relation with the belt shape without making the shape of the tire outer surface completely flat. When the tire outer surface has a shape more flat than the belt shape, the tire center portion is off the road surface, and the ground-contact length is greater in the tread end portion TE than in the tire center portion. In this case, rolling resistance is deteriorated, and moreover, the ground-contact pressure in the shoulder portion, which includes the tread end portion TE, is increased, and partial wear resistance performance is badly deteriorated. From the above, by setting the relation BD/BW<TD/TW, rolling resistance performance and partial wear resistance performance are improved.

The ratio restriction BD/BW<TD/TW also means that a tread gauge TGh measured in the tread end portion TE is less than a tread gauge TGc measured in the tread center portion.

Generally speaking, when the tread gauge measured on a shoulder portion side is small despite that the amount of wear is large on the shoulder portion side, the wear-resisting period might not be ensured, and wear resistance performance might be deteriorated. However, when the belt has the flat shape as in the present invention, the shoulder portion with the smaller tread gauge prevents the aforementioned increase in the ground-contact length and in the ground-contact pressure in the shoulder portion. As a result, good wear-resistance is achieved. Furthermore, with the small tread gauge in the shoulder portion, the amount of rubber deformed is reduced. As a result, rolling resistance is further lowered, and moreover, an advantageous effect that the weight of the tire is reduced is achieved.

The present inventor has conducted an ardent study on the appropriate range for the tread gauge and found according to Examples described below that a ratio TGh/TGc of the tread gauge TGh measured in the tread end TE, to the tread gauge TGc measured in the tread center portion, is preferably in the range of 0.5 to 0.9, and a ratio TGe/TGc of the tread gauge TGe measured in the end portion 3aE of the innermost layer 3a in the width direction, to the tread gauge TGc measured in the tread center portion, is preferably in the range of 0.2 to 0.6.

Furthermore, the relation TGe TGh is preferably satisfied.

Moreover, the ratio TD/TW is preferably greater than or equal to 0.05, more preferably in the range of 0.05 to 0.15.

The reason is that, in the tire with the flat belt line in which the ratio BD/BW is at most 0.04 as in the present invention, when the ratio TD/TW is greater than 0.15, this means, in a case of a normal size tire, that the tread gauge measured in the shoulder portion does not exist.

In addition, it is preferable that the tread gauge gradually decreases from the tread center portion to the shoulder portion.

The tread gauge refers to a thickness of the tread rubber from an outer side of the reinforcing member of the outermost circumferential belt layer 4 among the belts to the tread ground surface as measured on a normal line of the carcass 2 in the section in the tire widthwise direction in the state where the tire 10 is assembled to the application rim 7. In a portion of the tread where the innermost layer 3*a* is disposed, when a direction of the normal line of the carcass 2 considerably differs from a direction of a normal line of the innermost layer 3*a*, the tread gauge is measured on the normal line of the innermost layer 3*a*.

Figure 3:
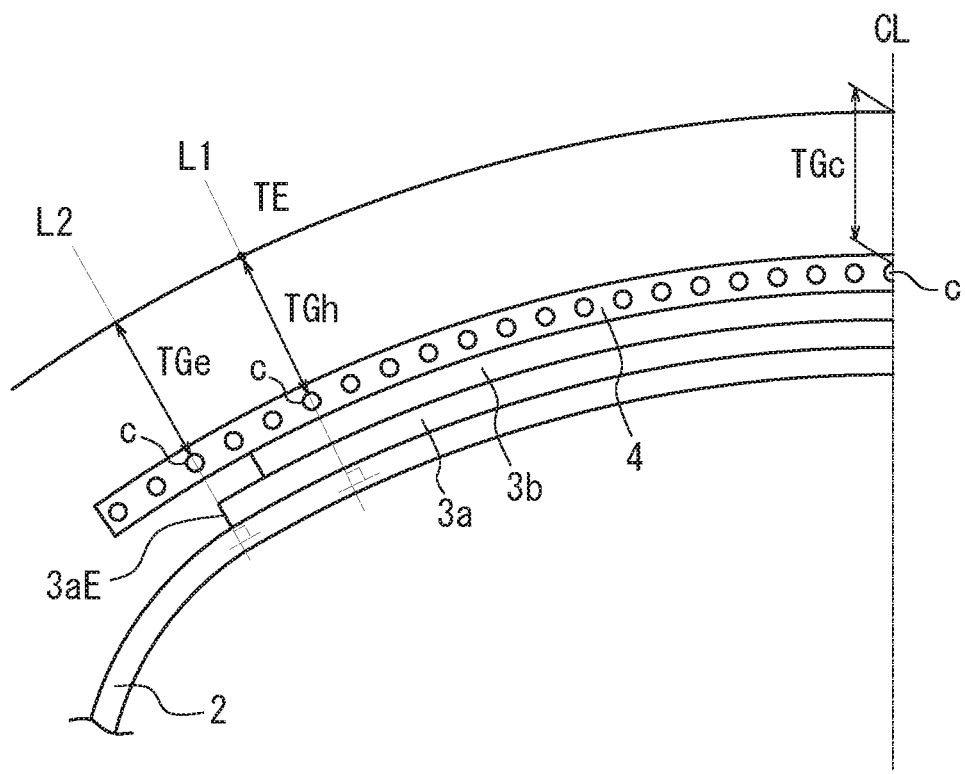
FIG. 3 is a view illustrating how a tread gauge is measured.

For example, with reference to FIG. 3, the tread gauge TGc in the tread center portion is measured on the tire equatorial plane CL and is identified as the thickness of the tread rubber measured from an outer side of a cord C included in the circumferential belt layer 4 to the tread ground surface. The tread gauge TGh at the tread end portion TE is measured on the normal line L1 of the carcass 2 passing through the tread end portion TE and is identified as the thickness of the tread rubber measured from the outer side of a cord C included in the circumferential belt layer 4 to the tread ground surface. The tread gauge TGe at the end portion 3*a*E of the innermost layer 3*a* in the widthwise direction is measured on the normal line L2 of the carcass 2 passing through the end portion 3*a*E in the widthwise direction and is identified as the thickness of the tread rubber measured from the outer side of a cord C included in the circumferential belt layer 4 to the tread ground surface.

Note that, when it is assumed that the circumferential belt layer 4 is not present in the example illustrated in FIG. 3, the tread gauges TGc and TGh each refer to the thickness of the tread rubber measured from the outer side of the corresponding cord included in the slant belt layer 3*b* to the tread ground surface, and the tread gauge TGe refers to the thickness of the tread rubber measured from the outer side of the corresponding cord included in the slant belt layer 3*a* to the tread ground surface. That is to say, the tread gauges each refer to a distance from the outer side of the corresponding outermost belt layer to the tread ground surface. In addition, in case of a tire having a pattern in which circumferential grooves are provided on the tire equatorial plane CL, the tread gauge measured at a point of the tread portion that is closest to the tire equatorial plane CL and not provided with any groove is defined as the tread gauge TGc.

When the tread rubber has a cap/base structure, the tread gauge refers to the thickness of the tread rubber including cap rubber plus base rubber.

When the shoulder portion is provided with lug grooves extending in the tire widthwise direction, it is preferable to set the depth of the lug grooves to be the same as conventional ones so as to even out the wear amount of the tread rubber and to set the thickness of the tread rubber from a bottom of each lug groove to the reinforcing member of the outermost belt layer to be small. The reason is that the above setting makes it possible to significantly improve wear resistance performance.

A ratio CSWh/CSH of the shortest distance CSWh between a line drawn in parallel with the rotation axis of the tire at a maximum width position Wcmax of the carcass 2 and a line drawn in parallel with the rotation axis of the tire at a bead toe 8, to a distance CSH in the tire radial direction between the radially outermost side of the carcass 2 and the bead toe 8, is preferably in the range of 0.6 to 0.9, and more preferably in the range of 0.65 to 0.8.

According to the above restriction, in particular, a carcass line of a tire side portion in the vicinity of the road surface has a locally bent region, and bending rigidity is relatively small in this region. As a result, portions around the bent region located on the outer side of the belt end in the widthwise direction deforms to a significant degree when load is applied thereto, whereby a magnitude of deformation in the tread portion decreases. In other words, a magnitude of shear deformation within the aforementioned section is reduced in the tread. As a result of trials with respect to various dimensions for effectively reducing deformation at the time of application of load, it has been revealed that the ratio CSWh/CSH is to be in the range of 0.6 to 0.9.

A ratio SWh/SH of the shortest distance SWh (which may be referred to below as the maximum width height) between a line drawn in parallel with the rotation axis of the tire at the maximum width position Wmax of the tire and a line drawn in parallel with the rotation axis of the tire at a bead toe 8, to a sectional height SH of the tire, is preferably in the range of 0.5 to 0.8, and more preferably in the range of 0.6 to 0.75.

Primarily, it is essential to regulate a shape of a side portion by a carcass line as a skeleton. However, the side portion is no exception to the phenomenon that energy loss occurs inside rubber and contributes to rolling resistance. That is to say, by providing the side portion with a shape also different from that of a conventional tire in conformity to the carcass line, efficient improvement would be achieved. Providing such a shape means to make side rubber relatively thin, for example. Although obvious it may be, if side rubber were to be eliminated, the dimension of the side portion would coincide with the maximum width of the carcass line. In actual practice, however, it is necessary to give a predetermined thickness to side rubber because the side rubber serves for example to protect the carcass upon contact with curbstones. The maximum width position of the side portion in the above situation in comparison with the tire sectional height was considered, and it was confirmed that a ratio SWh/SH were to be within the aforementioned ratio range. Meanwhile, since it is an important point to design a vulcanization mold in tire designing, the shape of the tire is to be defined as dimensions of the outer surface as tire designing, too.

A ratio BW/CSW of a width BW of the innermost layer 3*a*, to the maximum width CSW of the carcass 2, is preferably in the range of 0.8 to 0.94, and more preferably in the range of 0.84 to 0.93.

The tire according to the present invention has the belt of the flat shape. Therefore, as a matter of fact, a ground-contact shape of the tire is likely to expand in the widthwise direction, and the reinforcing layer needs to be structured in accordance with the expansion. In particular, in order to prevent partial wear, a ground-contact width over which the tire is in contact with the road surface is preferably less than a width along which a plurality of reinforcing layers are present. In view of the above, it has been confirmed that a belt width in the case employing a tire shape according to the present invention needs to be set wider than usual and that the belt width is preferably to comply with the restriction described above. On the other hand, as described in relation to sheer deformation in the widthwise section, when an excessive belt is disposed outside the contact patch, such a belt adversely affects rolling resistance. Accordingly, both the minimum value for restricting partial wear and the maximum value for restricting rolling resistance are important.

A ratio CSL/CSP of a path length CSL from a position corresponding to the end portion in 3aE in the widthwise direction of the innermost layer 3a to the maximum width position Wcmax of the carcass 2, to a path length CSP from a position corresponding to the center portion in the widthwise direction of the innermost layer 3a to a position right below the bead core 1, is preferably in the range of 0.1 to 0.25, and more preferably in the range of 0.12 to 0.18.

The above range is for restricting the length of a portion of the carcass 2 where the carcass 2 is locally bent as described above. Specifically, a desired localized deformation may be caused by optimizing, when designing a smooth curve linking the maximum width position Wcmax of the carcass line and the position below the belt, a carcass length in the corresponding curved region. When the carcass length is short in the above region, this means that the carcass direction changes from the radial direction to substantially the widthwise direction over the short length. Accordingly, the shape characteristics that the carcass is locally bent is reinforced.

Note that the pass length CSP to the position right below the bead core 1 refers to the substantial pass length of the carcass 2, and in case of an interposed-type bead core, the path length does not include a turning portion around the bead core 1 as illustrated in FIG. 1, and the path length is a length of the interposed portion.

The shortest distance CSEh (which may be referred to below as a turned-up height) between a terminal end 2E of a turn-up portion of at least one carcass ply layer and a line drawn in parallel with the rotation axis of the tire at the bead toe 8 is preferably greater than the maximum width height SWh.

When a tire with a nearly flat belt bends under load, the crown portion including the belt hardly bends and bending due to flexure is easily concentrated on the side portion. Such bending sometimes poses a problem in terms of tire appearance that cracks occur on the outer surface of the side portion.

In order to prevent the cracks from occurring on the outer surface of the side portion, i.e., in order to prevent strain on the outer surface of the side portion, one possible way is to increase bending rigidity of the side portion so as to restrain flexure of the side portion. However, since bending due to flexure is concentrated on the side portion to reduce the degree of deformation of the tread portion and to reduce energy loss of the tread portion as described above, it is required to reduce outer surface strain in the side portion while flexure in the side portion is maintained to be large. The inventor has tried various ways to reduce strain on the outer surface in the side portion while maintaining flexure in the side portion to be large and found it possible to restrain strain on the outer surface in the side portion by setting the turn-up height CSEh from the bead portion of the carcass ply higher than the maximum width height SWh. In the maximum width position Wmax of the tire where bending of the side portion is concentrated, the turn-up portion of the carcass ply is laid on a body portion of the carcass ply to form double layers so that a neutral axis of bending in this portion is displaced to the outer surface side. As a result, strain of the outer surface is restrained.

Figure 4A:
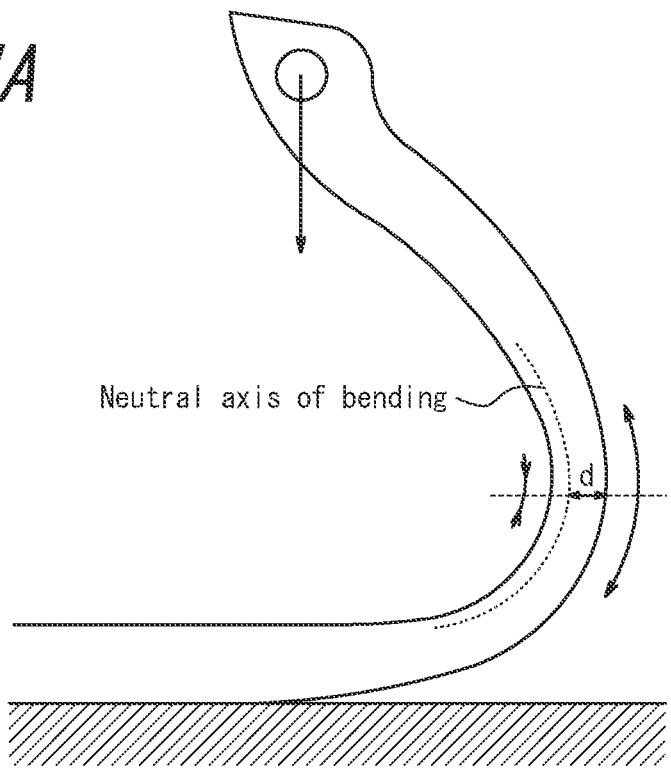
FIGS. 4A and 4B are views illustrating tensile strain when a neutral axis of bending is changed.
Figure 4B:
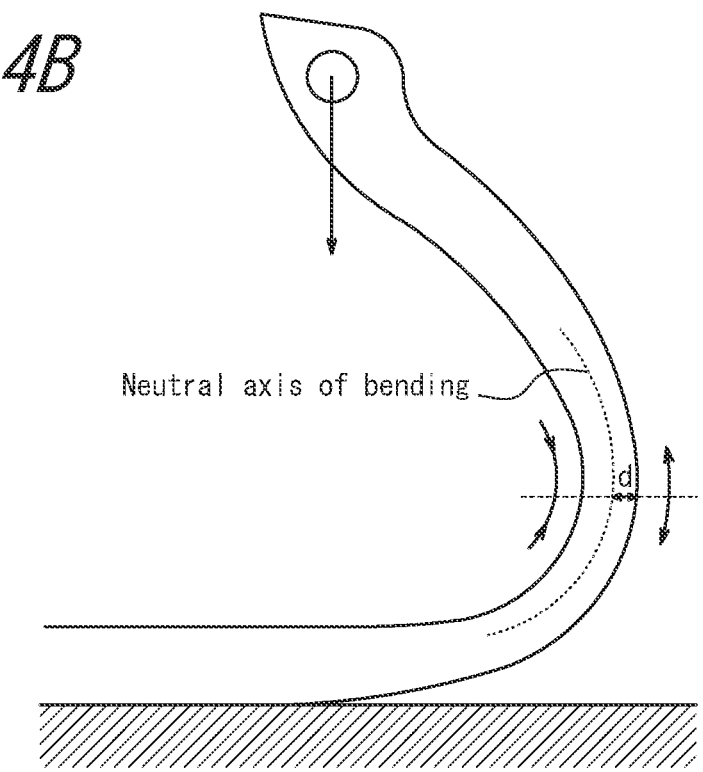

With reference to FIG. 4, an inner side of the neutral axis of is subject to compression stress while the outer side thereof is subject to tensile stress. Rubber has high rigidity with respect to compression stress but low rigidity with respect to tensile stress. Accordingly, as illustrated in FIG. 4A, when a distance d from the neutral axis of bending to the surface of the side portion is large, tensile strain acting on the outer side of the neutral axis of bending becomes small, and cracks tend to occur in this portion. To address the above, as illustrated in FIG. 4B, by setting the distance d from the neutral axis of bending to the surface of the side portion small, tensile strain acting on the outer side of the neutral axis of bending becomes small, whereby cracks are prevented from occurring in this position.

According to the present invention, by setting the turn-up height CSEh from the bead portion of the carcass ply higher than the maximum width height SWh, two carcass plies are disposed at the maximum width position Wmax of the tire on which bending of the side portion is concentrated, and the neutral axis of bending is displaced to the outer surface side. As a result, strain of the outer surface in the side portion is restrained. It is noted that, since only the turn-up height CSEh of the carcass ply is changed, flexure of the tire as a whole is not largely influenced.

By restricting the turn-up height CSEh of the carcass ply as described above, durability of the appearance of the side portion, which is often seen in a tire having a flat belt line, is improved without ruining the aforementioned rolling resistance performance and partial wear resistance performance.

A ratio CSEh/SWh is preferably greater than 1.0, more preferably in the range of 1.02 to 2.0, even more preferably in the range of 1.02 to 1.24. When the ratio CSEh/SWh is 1.0, i.e., when the end of the turn-up portion of the carcass ply is positioned at the maximum width position Wmax, the position of the end coincides with the center of bending, and therefore, it is likely that cracks may occur, starting from the end of the turn-up portion. Therefore, it is preferable that the ratio CSEh/SWh is greater than 1. The lower limit of the preferable range of the ratio CSEh/SWh is set to be 1.02 because of the fact that the turn-up height CSEh slightly varies due to manufacturing tolerance and because of the need for the turn-up height CSEh to be greater than the maximum width height SWh.

On the other hand, the upper limit of the preferable range of the ratio CSEh/SWh is set to 2.0 because the effect to restrain surface strain is not improved even when the turn-up height CSEh is increased to a height much above the maximum width height SWh. In addition, in most tires, when the ratio exceeds 2.0, the positional relation (envelope structure) that the end of the turn-up portion of the carcass ply exceeds a belt edge is established. When the turn-up portion is excessively large, flexure might be affected, and ride comfort might be degraded due to an increase in longitudinal spring. According to examples described below, it has been confirmed that advantageous effects of the present invention are sufficiently achieved when the CSEh/SWh is 1.24.

The present invention is not limited to the above embodiments, and various modifications are possible. For example, the carcass 2 may be constituted by using two carcass ply layers. The carcass 2 may also be configured to be interposed between the bead cores without being turned around the bead core 1. The carcass 2 may also have the envelop structure. Furthermore, the tire having an asymmetrical crown shape, asymmetrical belt shape/structure is included in the present invention. In the case of the asymmetrical tire, average values of left and right BD and TD are used as BD and TD.

Other embodiments of the belt structure in the pneumatic tire according to the present invention will be described hereinafter with reference to the drawings.

Figure 5A:
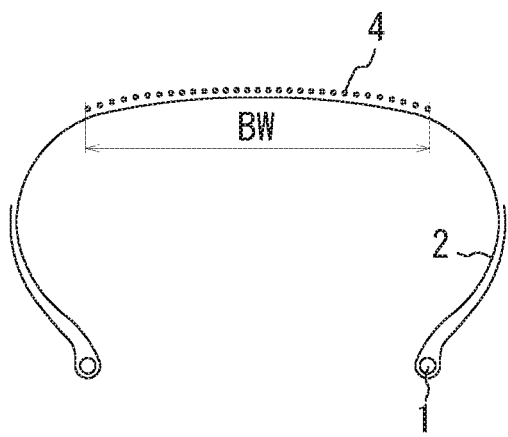
FIGS. 5A-5E are views illustrating examples of different belt structures of a pneumatic tire according to the present invention.

As illustrated in FIG. 5A, as the belt, one circumferential belt layer 4 with a width of 90% or more of the tread ground-contact width TW may be provided.

Figure 5B:
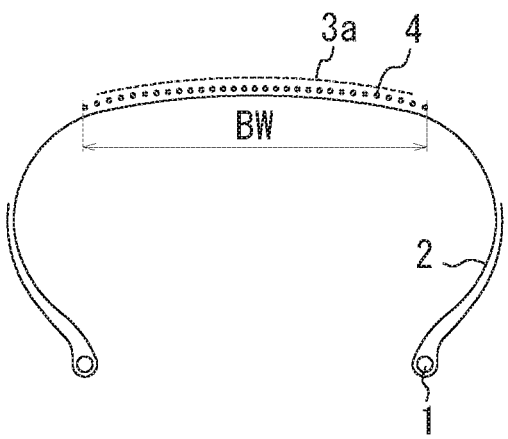

As illustrated in FIG. 5B, a so-called delta configuration, which includes one circumferential belt layer 4 having the width of 90% or more of the tread ground-contact width TW, and one slant belt layer 3a disposed on a radially outer side of the circumferential belt layer 4, may be adopted.

Figure 5C:
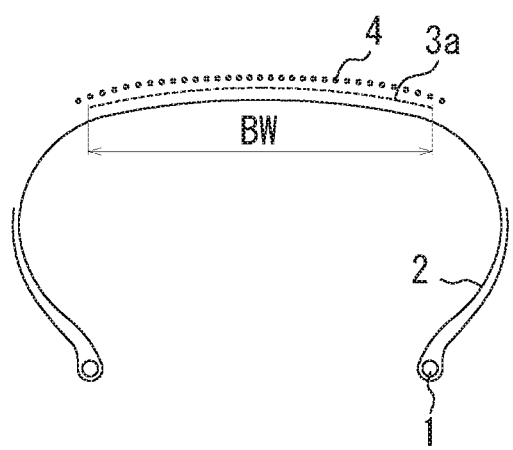

As illustrated in FIG. 5C, as another example of the delta configuration, one circumferential belt layer 4 may be disposed on a radially outer side of one slant layer 3a having the width of 90% or more of the tread ground-contact width TW.

Figure 5D:
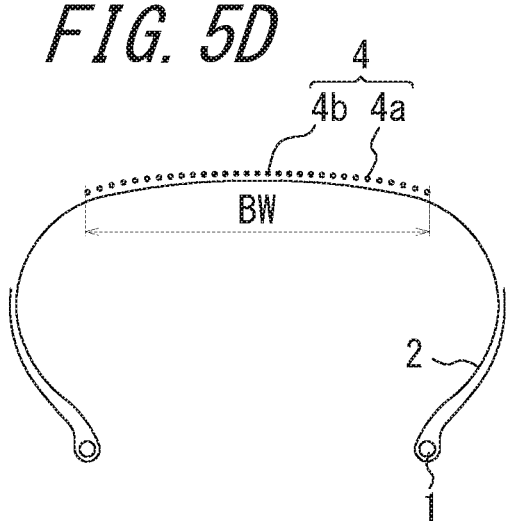

As illustrated in FIG. 5D, different cord materials may be used in the widthwise direction for the circumferential belt layer 4 having the width of 90% or more of the tread ground-contact width TW. That is to say, the circumferential belt layer 4 may be constituted by a circumferential belt layer 4a formed by coating a steel cord with rubber in the tread shoulder portion and a circumferential belt layer 4b formed by coating an organic fiber cord such as a nylon cord with rubber.

Figure 5E:
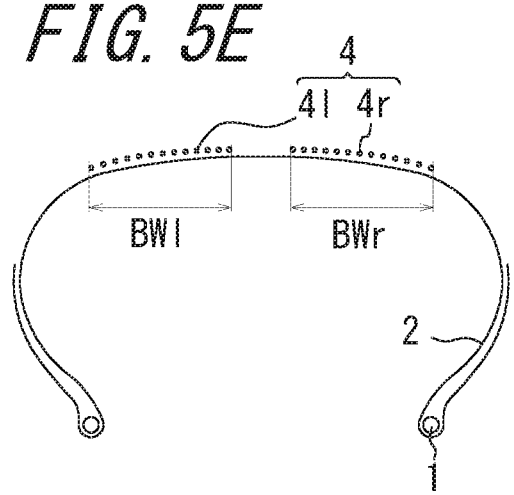

As illustrated in FIG. 5E, the circumferential belt layer 4 may be constituted by a left circumferential belt layer 41 and a right circumferential belt layer 4r, and the circumferential belt layer 4 may be interrupted near the tire equatorial plane CL. However, the width BW (BW=BW1+BWr), which is a sum of a width BW1 of the left circumferential belt layer 41 and a width BWr of the right circumferential belt layer 4r, is required to be at least 90% of the tread ground-contact width TW. In this case, the circumferential belt layer 4 corresponds to the "innermost layer" defined in the present invention. Note that in the present embodiment the radius difference BD is defined as an average value of falling heights of the layers 41 and 4r from an end on a tire center side to an end in the widthwise direction.

EXAMPLES

Examples of the present invention will be described hereinafter. However, the present invention is not limited to the examples.

FEM model of Conventional Example tire, Comparative Example tires, and Example tires having the size of 195/65R15 with the specifications shown in Tables 1 and 2 are experimentally created, and each model of test tire is subjected to examination of rolling resistance performance, examination of wear resistance performance, and weight measurement as Example 1 (Table 1) and also subjected to examination of rolling resistance performance, examination of wear resistance performance, weight measurement, examination of longitudinal spring performance, and durability examination of cracks in the side portion. The results of the each test are calculated by FEM.

Each model of test tire has the same tire structure including one carcass ply layer, two slant belt layers in which cords in one layer cross cords in the other layer, the cords being disposed at an inclination angle of 24° with respect to the tire equatorial plane CL, and a circumferential nylon belt disposed thereabove. The thickness from the tire inner surface to the tire outer surface at the tire maximum width position Wmax is approximately the same.

(Rolling Resistance Examination)

Rolling resistance was calculated by using FEM model in such a manner that each test tire was assembled to a standard rim and filled with an internal pressure of 210 kPa, and then, rolling resistance of the vehicle axis was measured using a drum examination machine (of a speed of 80 km/h) having an iron plate whose diameter was 1.7 m. The measurement of rolling resistance was performed in smooth drum and forth way according to ISO18164. Measurement results shown in Tables 1 and 2 are indexed with rolling resistance of Conventional Example tire being defined as 100, and a smaller value indicates better rolling resistance. In evaluation, tolerance is ignored, and a difference of more than or equal to 4% is regarded as a significant difference from the viewpoint of market superiority. In particular, when rolling resistance of greater than or equal to 10% is observed, this indicates a significant effect.

(Wear Resistance Examination)

Wear resistance examination was calculated by using FEM model in such a manner that each test tire was assembled to the standard rim and filled with an internal pressure of 210 kPa, using an indoor drum examination machine (of the speed of 80 km/h) having a surface with a safety walk whose diameter was 1.7 m under the same load condition as the rolling resistance examination. The input of fee rolling for 10 minutes and the input of 0.1 G in a braking direction are alternately repeated. The abrasion weight (the amount of abraded rubber) after 1,200 km run under the above condition was measured. Measurement results shown in Tables 1 and 2 are indexed with the abrasion weight of Conventional Example tire being defined as 100, and a smaller value indicates better wear performance. Difference of more than or equal to 1.5% is regarded as a significant difference, and difference of more than or equal to 10% is regarded as a remarkable difference.

Since this examination compares the weight of worn rubber, the examination contains a strong implication of wear resistance examination. However, since a tire having poor partial wear resistance performance is worn out at an early stage, such detection is possible by the examination. That is to say, the idea allows approaches from both partial wear resistance and abrasion resistance.

(Weight Measurement)

The weight of each test tire alone before the tire is assembled to a rim was calculated by using FEM model. Measurement results shown in Tables 1 and 2 are indexed with weight of Conventional Example tire being defined as 100, and a smaller value indicates a smaller weight.

(Longitudinal Spring Performance)

The amount of deflection was calculated during the rolling resistance examination, and spring calculated by a "load/bending amount" was indexed. A larger value indicates a small flexure amount. In other words, a smaller value indicates a larger flexure amount and better ride comfort. The flexure amount is calculated by subtracting the tire axis height under load from the tire axis height under no load.

(Durability Examination of Cracks in Side Portion)

Durability examination of cracks in the side portion was calculated by using a FEM model in such a manner that each test tire was assembled to the standard rim and filled with an internal pressure of 210 kPa, and then, a running distance was calculated under the load condition of 2.5 times the regular load (i.e. condition where occurrence of cracks is promoted) using the drum examination machine (of the speed of 80 km/h) having the iron plate whose diameter was 1.7 m until cracks were generated in the side portion. Measurement results are indexed, and a larger value indicates fewer cracks.

Example 1

TABLE 1

| | Dimension of tire outer surface | | | | | Structural dimension | | | | | | | | |
|---|---|---|---|---|---|---|---|---|---|---|---|---|---|---|
| | SW mm | SWh mm | SH mm | TW mm | TD mm | TGc mm | TGh mm | TGe mm | CSW mm | BW mm | CSWh mm | BD mm | CSH mm | $L/L_{total}$ — |
| Conventional Example 1 | 204 | 63 | 127 | 120 | 6 | 10 | 10.5 | 8 | 198 | 140 | 63 | 8 | 114 | 0.26 |
| Comparative Example 1 | 204 | 63 | 127 | 120 | 6 | 10 | 4.3 | 1.3 | 198 | 140 | 63 | 0.8 | 114 | 0.26 |
| Comparative Example 2 | 204 | 63 | 127 | 120 | 4.5 | 10 | 10.5 | 8 | 198 | 140 | 63 | 5.5 | 114 | 0.26 |
| Example 1 | 204 | 63 | 127 | 120 | 6 | 10 | 9.1 | 6.1 | 198 | 140 | 63 | 5.6 | 114 | 0.26 |
| Example 2 | 204 | 63 | 127 | 120 | 6.1 | 10 | 8.9 | 6 | 198 | 140 | 63 | 5.6 | 114 | 0.26 |
| Example 3 | 204 | 63 | 127 | 120 | 6 | 10 | 8.8 | 5.8 | 198 | 140 | 63 | 5.3 | 114 | 0.26 |
| Example 4 | 204 | 63 | 127 | 120 | 5.2 | 10 | 9.1 | 6.1 | 198 | 140 | 63 | 4.8 | 114 | 0.26 |
| Exampla 5 | 204 | 63 | 127 | 120 | 6 | 10 | 8.3 | 5.3 | 198 | 140 | 63 | 4.8 | 114 | 0.26 |
| Example 6 | 204 | 63 | 127 | 120 | 4.2 | 10 | 9.1 | 6.1 | 198 | 140 | 63 | 3.8 | 114 | 0.26 |
| Example 7 | 204 | 63 | 127 | 120 | 6 | 10 | 7.3 | 4.3 | 198 | 140 | 63 | 3.8 | 114 | 0.26 |
| Example 8 | 204 | 63 | 127 | 120 | 6 | 10 | 6.3 | 3.3 | 198 | 140 | 63 | 2.8 | 114 | 0.26 |
| Example 9 | 204 | 63 | 127 | 120 | 6 | 10 | 4.9 | 1.9 | 198 | 140 | 63 | 1.4 | 114 | 0.26 |
| Example 10 | 204 | 63 | 127 | 120 | 5.9 | 10 | 5.1 | 2 | 198 | 140 | 63 | 1.4 | 114 | 0.26 |
| Example 11 | 204 | 70 | 127 | 120 | 6 | 10 | 7.3 | 4.3 | 198 | 140 | 71 | 3.8 | 114 | 0.26 |
| Example 12 | 204 | 78 | 127 | 120 | 6 | 10 | 7.3 | 4.3 | 198 | 140 | 78 | 3.8 | 114 | 0.26 |
| Example 13 | 204 | 86 | 127 | 120 | 6 | 10 | 7.3 | 4.3 | 198 | 140 | 86 | 3.8 | 114 | 0.26 |
| Example 14 | 204 | 99 | 127 | 120 | 6 | 10 | 7.3 | 4.3 | 198 | 140 | 99 | 3.8 | 114 | 0.26 |
| Example 15 | 204 | 104 | 127 | 120 | 6 | 10 | 7.3 | 4.3 | 198 | 140 | 107 | 3.8 | 114 | 0.26 |
| Example 16 | 204 | 86 | 127 | 120 | 6 | 10 | 7.3 | 4.3 | 198 | 161 | 86 | 3.8 | 114 | 0.22 |
| Example 17 | 204 | 86 | 127 | 120 | 6 | 10 | 7.3 | 4.3 | 198 | 168 | 86 | 3.8 | 114 | 0.18 |
| Example 18 | 204 | 86 | 127 | 120 | 6 | 10 | 7.3 | 4.3 | 198 | 163 | 86 | 3.8 | 114 | 0.17 |
| Example 19 | 204 | 86 | 127 | 120 | 6 | 10 | 7.3 | 4.3 | 198 | 186 | 86 | 3.8 | 114 | 0.16 |
| Example 20 | 204 | 86 | 127 | 120 | 6 | 10 | 7.3 | 4.3 | 198 | 191 | 86 | 3.8 | 114 | 0.15 |
| Example 21 | 204 | 76 | 127 | 120 | 6 | 10 | 7.3 | 4.3 | 198 | 168 | 76 | 3.8 | 114 | 0.26 |
| Example 22 | 204 | 81 | 127 | 120 | 6 | 10 | 7.3 | 4.3 | 198 | 168 | 81 | 3.8 | 114 | 0.25 |
| Example 23 | 204 | 86 | 127 | 120 | 6 | 10 | 7.3 | 4.3 | 198 | 168 | 86 | 3.8 | 114 | 0.16 |
| Example 24 | 204 | 93 | 127 | 120 | 6 | 10 | 7.3 | 4.3 | 198 | 181 | 93 | 3.8 | 114 | 0.12 |
| Example 25 | 204 | 95 | 127 | 120 | 6 | 10 | 7.3 | 4.3 | 198 | 191 | 95 | 3.8 | 114 | 0.09 |

| | BD/BW | TD/TW | TGh/TGc | TGe/TGc | CSWh/CSN | BW/CSW | SWh/SH | CSL/CSP | Rolling resistance | Wear | Weight |
|---|---|---|---|---|---|---|---|---|---|---|---|
| Conventional Example 1 | 0.057 | 0.050 | 1.050 | 0.800 | 0.553 | 0.707 | 0.496 | 0.260 | 100 | 100 | 100 |
| Comparative Example 1 | 0.006 | 0.050 | 0.430 | 0.130 | 0.553 | 0.707 | 0.496 | 0.260 | 94 | 99 | 95.5 |
| Comparative Example 2 | 0.039 | 0.038 | 1.050 | 0.800 | 0.553 | 0.707 | 0.496 | 0.260 | 94 | 99 | 102 |
| Example 1 | 0.040 | 0.050 | 0.910 | 0.610 | 0.553 | 0.707 | 0.496 | 0.260 | 98 | 98 | 99 |
| Example 2 | 0.040 | 0.051 | 0.890 | 0.600 | 0.553 | 0.707 | 0.496 | 0.260 | 95 | 97 | 99 |
| Example 3 | 0.038 | 0.050 | 0.880 | 0.580 | 0.553 | 0.707 | 0.496 | 0.260 | 90 | 95 | 98 |
| Example 4 | 0.034 | 0.043 | 0.910 | 0.610 | 0.553 | 0.707 | 0.496 | 0.260 | 88 | 93.5 | 99 |
| Example 5 | 0.034 | 0.050 | 0.830 | 0.530 | 0.553 | 0.707 | 0.496 | 0.260 | 88 | 92 | 97.5 |
| Example 6 | 0.027 | 0.035 | 0.910 | 0.610 | 0.553 | 0.707 | 0.496 | 0.260 | 88 | 92 | 99 |
| Example 7 | 0.027 | 0.050 | 0.730 | 0.430 | 0.553 | 0.707 | 0.496 | 0.260 | 84 | 90 | 97 |
| Example 8 | 0.020 | 0.050 | 0.630 | 0.330 | 0.553 | 0.707 | 0.496 | 0.260 | 90 | 95 | 96.5 |
| Example 9 | 0.010 | 0.050 | 0.490 | 0.190 | 0.553 | 0.707 | 0.496 | 0.260 | 93.5 | 98 | 96 |
| Example 10 | 0.010 | 0.049 | 0.510 | 0.200 | 0.553 | 0.707 | 0.496 | 0.260 | 92.5 | 98.5 | 96 |
| Example 11 | 0.027 | 0.050 | 0.730 | 0.430 | 0.623 | 0.707 | 0.551 | 0.260 | 82 | 86 | 97 |
| Example 12 | 0.027 | 0.050 | 0.730 | 0.430 | 0.684 | 0.707 | 0.614 | 0.260 | 80 | 85 | 97 |
| Example 13 | 0.027 | 0.050 | 0.730 | 0.430 | 0.754 | 0.707 | 0.677 | 0.260 | 78 | 84 | 97 |
| Example 14 | 0.027 | 0.050 | 0.730 | 0.430 | 0.868 | 0.707 | 0.780 | 0.260 | 84 | 88 | 97 |
| Example 15 | 0.027 | 0.050 | 0.730 | 0.430 | 0.939 | 0.707 | 0.819 | 0.260 | 87 | 92 | 97 |
| Example 16 | 0.024 | 0.050 | 0.730 | 0.430 | 0.754 | 0.813 | 0.677 | 0.220 | 76 | 80 | 97.6 |
| Example 17 | 0.023 | 0.050 | 0.730 | 0.430 | 0.754 | 0.848 | 0.677 | 0.180 | 72 | 78 | 97.8 |
| Example 18 | 0.021 | 0.050 | 0.730 | 0.430 | 0.754 | 0.924 | 0.677 | 0.170 | 73 | 77 | 97.9 |
| Example 19 | 0.020 | 0.050 | 0.730 | 0.430 | 0.754 | 0.939 | 0.677 | 0.160 | 74 | 79 | 98 |
| Example 20 | 0.020 | 0.050 | 0.730 | 0.430 | 0.754 | 0.965 | 0.677 | 0.150 | 79 | 85 | 98.1 |
| Example 21 | 0.023 | 0.050 | 0.730 | 0.430 | 0.667 | 0.848 | 0.598 | 0.260 | 78 | 81 | 97.8 |
| Example 22 | 0.023 | 0.050 | 0.730 | 0.430 | 0.711 | 0.848 | 0.638 | 0.250 | 78 | 79 | 97.8 |
| Example 23 | 0.023 | 0.050 | 0.730 | 0.430 | 0.754 | 0.848 | 0.677 | 0.160 | 73 | 80 | 97.8 |
| Example 24 | 0.021 | 0.050 | 0.730 | 0.430 | 0.816 | 0.914 | 0.732 | 0.120 | 75 | 81 | 97.9 |
| Example 25 | 0.020 | 0.050 | 0.730 | 0.430 | 0.833 | 0.965 | 0.748 | 0.090 | 79 | 82 | 98.1 |

Figure 6:
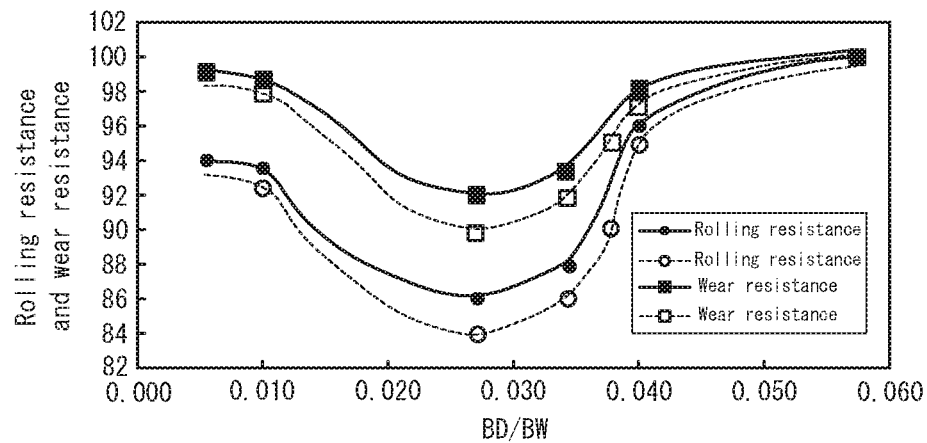
FIG. 6 is a graph illustrating rolling resistance performance and wear performance with respect to a ratio BD/BW.

FIG. 6 is a graph representing the results shown in Table 1, with the horizontal axis representing the ratio BD/BW and the vertical axis representing rolling resistance performance and wear performance.

From FIG. 6 and Table 1, it can be seen that, when the ratio BD/BW is in the range of 0.01 to 0.04, and the relation BD/BW<TD/TW is satisfied, rolling resistance performance is less than or equal to 96, and wear performance is less than or equal to 98.5, and thus, both the performance is improved Conventional Example tire.

Furthermore, from comparison between solid lines (where the requirements recited in claim 1 are satisfied) and broken lines (where the requirements recited in claim 2 are satisfied) in FIG. 6, it can be seen that rolling resistance performance and wear performance are improved in the tests represented by the broken lines. That is to say, it can be seen that rolling resistance performance and wear performance are further improved by setting the ratios TGh/TGc and TGe/TGc within the appropriate ranges.

Figure 7:
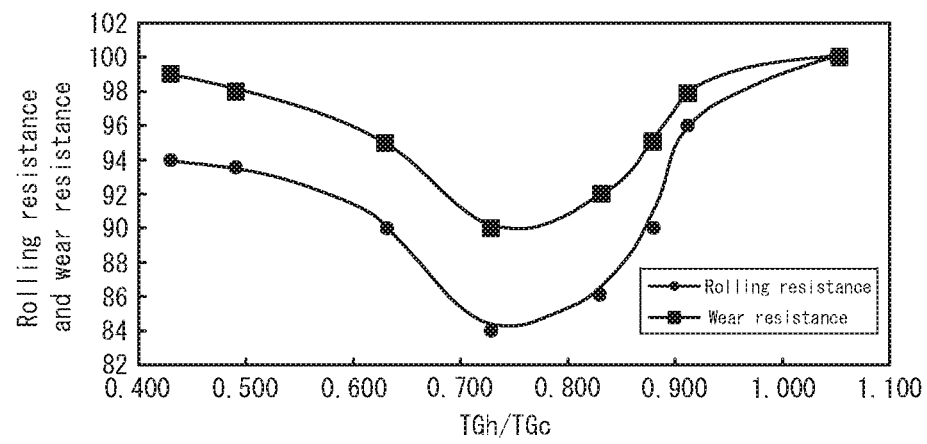
FIG. 7 is a graph illustrating rolling resistance performance and wear performance with respect to a ratio TGh/TGc.
Figure 8:
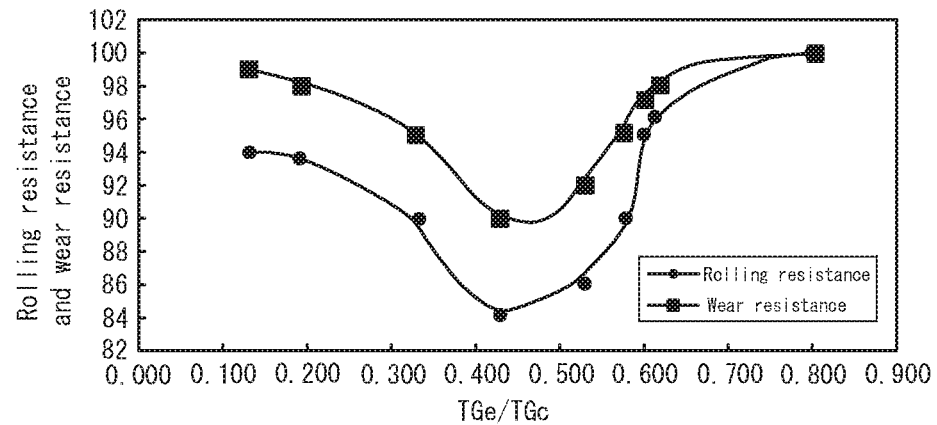
FIG. 8 is a graph illustrating rolling resistance performance and wear performance with respect to a ratio TGe/TGc.

FIG. 7 is a graph representing the results shown in Table 1, with the horizontal axis representing the ratio TGh/TGc and the vertical axis representing rolling resistance performance and wear performance. FIG. 8 is a graph representing the results shown in Table 1, with the horizontal axis representing the ratio TGe/TGc and the vertical axis representing rolling resistance performance and wear performance.

From FIG. 7 and Table 1, it can be seen that, when the ratio TGh/TGc is in the range of 0.5 to 0.9, rolling resistance performance is less than or equal to 95, and wear performance is less than or equal to 98.5, and thus, both the performance is improved compared with Conventional Example tire. It can also be seen that, when the ratio TGh/TGc is in the range of 0.6 to 0.88, rolling resistance performance is less than or equal to 91, and wear performance is less than or equal to 96, and thus, both the performance is further improved.

From FIG. 8 and Table 1, it can be seen that, when the ratio TGe/TGc is in the range of 0.2 to 0.6, rolling resistance performance is less than or equal to 95, and wear performance is less than or equal to 98.5, and thus, both the performance is improved compared with Conventional Example tire. It can also be seen that, when the ratio TGe/TGc is in the range of 0.3 to 0.58, rolling resistance performance is less than or equal to 91, and wear performance is less than or equal to 96, and thus, both the performance is further improved.

Furthermore, from Table 1, it can be seen that, when the relation BD/BW<TD/TW is satisfied, the tire weight is reduced. Specifically, Comparative Example tire 2 satisfies the relation BD/BW=0.039, which is within the restriction range of the present invention. However, Comparative Example tire 2 also satisfies the relation TD/TW<BD/BW, which deviates from the restriction of the present invention. Accordingly, although both rolling resistance performance and wear performance are improved compared with Conventional Example tire, the tire weight is increased to 102. On the other hand, in the Example tire having the restricted tread gauge distribution (BD/BW<TD/TW), the tire weight is reduced compared with Conventional Example tire, and rolling resistance performance and wear performance are improved to be greater than or equal to Comparative Example tire 2.

Meanwhile, since wear resistance performance is deteriorated when the tread gauge in the shoulder portion is reduced, conventionally it was impossible to set the thickness of the tread gauge in the shoulder portion to be small. However, it has been found that, by combining the restriction of the belt line according to the present invention with the technique of reducing the gauge in the shoulder portion, advantageous effects by the tread gauge reduction of further reducing rolling resistance and of reducing the weight may be obtained at the same time while wear resistance is maintained.

Figure 9:
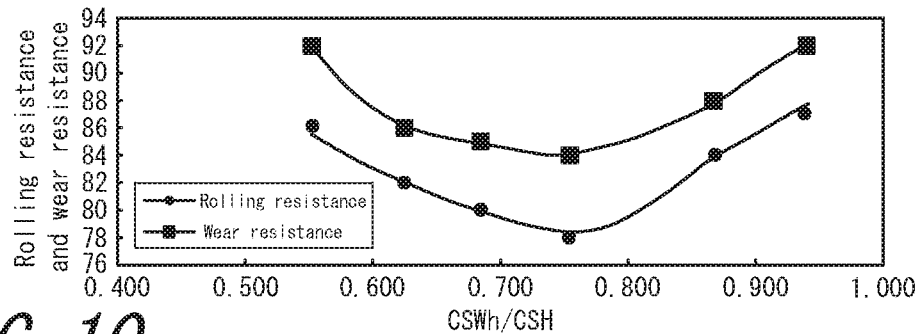
FIG. 9 is a graph illustrating rolling resistance performance and wear performance with respect to a ratio CSWh/CSH.

FIG. 9 is a graph representing the results shown in Table 1, with the horizontal axis representing the ratio CSWh/CSH and the vertical axis representing rolling resistance performance and wear performance.

From FIG. 9 and Table 1 (Example tires 7 and 11-15), it can be seen that, when the ratio CSWh/CSH is in the range of 0.6 to 0.9, rolling resistance performance is less than or equal to 86, and wear performance is less than or equal to 90, and thus, both the performance is improved compared with Conventional Example tire. It can also be seen that, when the ratio CSWh/CSH is in the range of 0.7 to 0.8, rolling resistance performance is less than or equal to 80, and wear performance is less than or equal to 85, and thus, both the performance is further improved.

Figure 10:
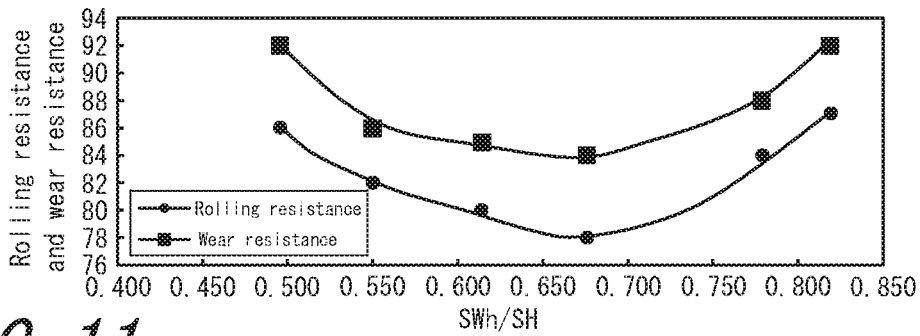
FIG. 10 is a graph illustrating rolling resistance performance and wear performance with respect to a ratio SWh/SH.

FIG. 10 is a graph representing the results shown in Table 1, with the horizontal axis representing the ratio SWh/SH and the vertical axis representing rolling resistance performance and wear performance.

From FIG. 10 and Table 1 (Example tires 7 and 11-15), it can be seen that, when the ratio SWh/SH is in the range of 0.5 to 0.8, rolling resistance performance is less than or equal to 86, and wear performance is less than or equal to 90, and thus, both the performance is improved compared with Conventional Example tire. It can also be seen that, when the ratio CSWh/CSH is in the range of 0.6 to 0.75, rolling resistance performance is less than or equal to 81, and wear performance is less than or equal to 87, and thus, both the performance is further improved.

Figure 11:
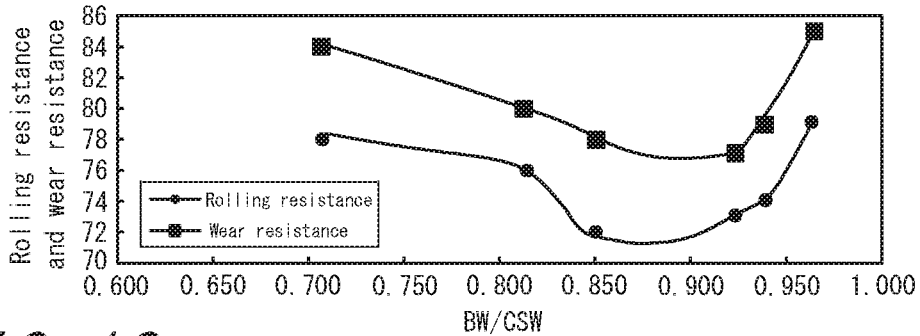
FIG. 11 is a graph illustrating rolling resistance performance and wear performance with respect to a ratio BW/CSW.

FIG. 11 is a graph representing the results shown in Table 1, with the horizontal axis representing the ratio BW/CSW and the vertical axis representing rolling resistance performance and wear performance.

From FIG. 11 and Table 1 (Example tires 13 and 16-20), it can be seen that, when the ratio BW/CSW is in the range of 0.8 to 0.94, rolling resistance performance is less than or equal to 77, and wear performance is less than or equal to 81, and thus, both the performance is improved compared with Conventional Example tire. It can also be seen that, when the ratio BW/CSW is in the range of 0.84 to 0.93, rolling resistance performance is less than or equal to 73, and wear performance is less than or equal to 79, and thus, both the performance is further improved.

Figure 12:
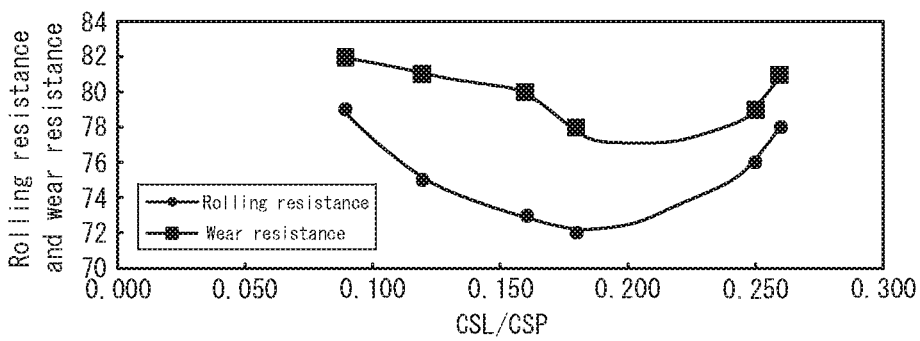
FIG. 12 is a graph illustrating rolling resistance performance and wear performance with respect to a ratio CSL/CSP.

FIG. 12 is a graph representing the results shown in Table 1, with the horizontal axis representing the ratio CSL/CSP and the vertical axis representing rolling resistance performance and wear performance.

From FIG. 12 and Table 1 (Example tires 17 and 21-25), it can be seen that, when the ratio CSL/CSP is in the range of 0.1 to 0.25, rolling resistance performance is less than or equal to 78, and wear performance is less than or equal to 82, and thus, both the performance is improved compared with Conventional Example tire. It can also be seen that, when the ratio CSL/CSP is in the range of 0.12 to 0.24, rolling resistance performance is less than or equal to 75, and wear performance is less than or equal to 81, and thus, both the performance is further improved.

Example 2

TABLE 2

| | Dimension of tire outer surface | | | | | Structural dimension | | | | | | | | | |
|---|---|---|---|---|---|---|---|---|---|---|---|---|---|---|---|
| | SW mm | SWh mm | SH mm | TW mm | TD mm | TGc mm | TGh mm | TGe mm | CSW mm | BW mm | CSWh mm | BD mm | CSH mm | L/L$_{total}$ — | CSEh mm |
| Example 26 | 204 | 78 | 127 | 120 | 6 | 10 | 7.3 | 4.3 | 198 | 140 | 78 | 3.8 | 114 | 0.26 | 80 |
| Example 27 | 204 | 78 | 127 | 120 | 6 | 10 | 7.3 | 4.3 | 198 | 140 | 78 | 3.8 | 114 | 0.26 | 97 |
| Example 28 | 204 | 78 | 127 | 120 | 6 | 10 | 7.3 | 4.3 | 198 | 140 | 78 | 3.8 | 114 | 0.26 | 105 |
| Example 29 | 204 | 78 | 127 | 120 | 6 | 10 | 7.3 | 4.3 | 198 | 140 | 78 | 3.8 | 114 | 0.26 | 73 |
| Example 30 | 204 | 78 | 127 | 120 | 6 | 10 | 7.3 | 4.3 | 198 | 140 | 78 | 3.8 | 114 | 0.26 | 85 |

| | BD/ BW | TD/ TW | TGh/ TGc | TGe/ TGc | CSWh/ CSH | BW/ CSW | SWh/SH | CSL/CSP | CSEh/ SWh | Rolling resistance | Wear | Weight | Longitudinal spring | Durability of cracks in side portion |
|---|---|---|---|---|---|---|---|---|---|---|---|---|---|---|
| Example 26 | 0.027 | 0.050 | 0.730 | 0.430 | 0.684 | 0.707 | 0.614 | 0.260 | 1.03 | 80 | 85 | 97 | 100 | 109 |
| Example 27 | 0.027 | 0.050 | 0.730 | 0.430 | 0.684 | 0.707 | 0.614 | 0.260 | 1.24 | 80 | 85 | 97.4 | 101.5 | 115 |
| Example 28 | 0.027 | 0.050 | 0.730 | 0.430 | 0.684 | 0.707 | 0.614 | 0.260 | 1.35 | 82 | 86 | 97.6 | 104.1 | 116 |
| Example 29 | 0.027 | 0.050 | 0.730 | 0.430 | 0.684 | 0.707 | 0.614 | 0.260 | 0.94 | 80 | 85 | 96.8 | 99.5 | 90 |
| Example 30 | 0.027 | 0.050 | 0.730 | 0.430 | 0.684 | 0.707 | 0.614 | 0.260 | 0.83 | 80 | 85 | 96.6 | 99 | 86 |

From Table 2, it can be seen that a greater ratio CSEh/SWh indicates more improved durability performance against cracks in the side portion. However, from comparison between Example tire 27 and Example tire 28, it can be seen that, even when the ratio CSEh/SWh increases from 1.24 to 1.35, durability performance against cracks in the side portion is improved only by 1, and longitudinal spring performance is increased greatly by 2.6. From the above, it can be said that the advantageous effects of the present invention are obtained sufficiently when the ratio CSEh/SWh is less than or equal to 1.24.

On the other hand, in Example tire 29 and Example tire 30 in which the ratio CSEh/SWh is less than or equal to 1.0, it is ensured that durability performance against cracks in the side portion tends to be decreased.

From the above results, it has been confirmed that durability performance against cracks in the side portion is improved by setting the ratio CSEh/SWh to be greater than 1.0.

REFERENCE SIGNS LIST 1 bead core
2 carcass
2 carcass ply
3a slant belt layer (innermost layer)
3b slant belt layer
4 circumferential belt layer
6 tread
7 rim
8 bead toe
10 pneumatic tire
TE tread end portion
CL tire equatorial plane

The invention claimed is:

1. A pneumatic tire having at least one carcass layer as a skeleton extending in a toroidal shape over a pair of bead portions, a belt including two or more slant belt layers and a tread that are disposed on an outer side in a tire radial direction of a crown portion of the at least one carcass layer, wherein in a section of the tire in a tire widthwise direction in a state where the tire is assembled to an application rim, a ratio BD/BW of radius difference BD between radius at a center portion and radius at an end portion in the tire widthwise direction of an innermost slant belt layer, to a width BW of the innermost slant belt layer, is in a range of 0.01 to 0.04, a ratio TD/TW of radius difference TD between radius at a center portion and radius at an end portion of the tread in the tire widthwise direction of a tread ground surface, to a tread ground-contact width TW, satisfies the relation BD/BW<TD/TW, a relation BW>TW is satisfied, the innermost slant belt layer is a layer positioned radially innermost among belt layers having a width greater than or equal to 90% of the tread ground-contact width TW, and the ratio TD/TW≥0.05, a ratio TGe/TGc of a tread gauge TGe measured in the end portion in the tire widthwise direction of the innermost slant belt layer to a tread gauge TGc measured in a tread center portion is in the range of 0.2 to 0.6.

2. The pneumatic tire according to claim 1, wherein a ratio TGh/TGc of a tread gauge TGh measured in a tread end portion, to a tread gauge TGc measured in a tread center portion, is in the range of 0.5 to 0.9.

3. The pneumatic tire according to claim 1, wherein a ratio CSWh/CSH of a shortest distance CSWh between a line drawn in parallel with a rotation axis of the tire at a maximum width position of the at least one carcass layer and a line drawn in parallel with the rotation axis of the tire at a bead toe, to a distance CSH in the tire radial direction between an outermost side of the carcass in the tire radial direction and the bead toe, is in the range of 0.6 to 0.9.

4. The pneumatic tire according to claim 1, wherein a ratio SWh/SH of a shortest distance SWh between a line drawn in parallel with the rotation axis of the tire at a maximum width position of the tire and a line drawn in parallel with the rotation axis of the tire at a bead toe, to a sectional height SH of the tire, is in the range of 0.5 to 0.8.

5. The pneumatic tire according to claim 1, wherein a ratio BW/CSW of the width BW of the innermost slant belt layer, to a maximum width CSW of the at least one carcass layer, is in the range of 0.8 to 0.94.

6. The pneumatic tire according to claim 1, wherein
a ratio CSL/CSP of a path length CSL from a position corresponding to the end portion in the tire widthwise direction of the innermost slant belt layer to a position corresponding to the maximum width position of the at least one carcass layer, to a path length CSP from a position corresponding to the center portion in the tire widthwise direction of the innermost slant belt layer to a position right below a bead core, is in the range of 0.1 to 0.25.

7. The pneumatic tire according to claim 1, wherein
a shortest distance CSEh between a terminal end of a turn-up portion of the at least one carcass layer and a line drawn in parallel with the rotation axis of the tire at a bead toe is greater than a shortest distance SWh between a line drawn in parallel with the rotation axis of the tire at a maximum width position of the tire and a line drawn in parallel with the rotation axis of the tire at the a bead toe.

8. The pneumatic tire according to claim 1, wherein a ratio of BW/TW is the range of 1.1 to 1.6.

\* \* \* \* \*